(12) United States Patent
Chemin et al.

(10) Patent No.: US 8,415,824 B2
(45) Date of Patent: Apr. 9, 2013

(54) POWER SUBASSEMBLY FOR MICRO-HYBRID SYSTEM IN AN AUTOMOBILE

(75) Inventors: Michaël Chemin, Festigny (FR); Roger Abadia, Neuilly Plaisance (FR); Fabien Guerin, Chatillon (FR); Thierry Mandion, Champagne sur Seine (FR); Patrick Rondier, Montmagny (FR); Cédric Leboeuf, Benfeld (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 0 days.

(21) Appl. No.: 12/599,573

(22) PCT Filed: May 7, 2008

(86) PCT No.: PCT/FR2008/050805
§ 371 (c)(1),
(2), (4) Date: Sep. 22, 2010

(87) PCT Pub. No.: WO2008/149002
PCT Pub. Date: Dec. 11, 2008

(65) Prior Publication Data
US 2011/0006599 A1 Jan. 13, 2011

(30) Foreign Application Priority Data
May 11, 2007 (FR) .................................. 07 55004

(51) Int. Cl.
*B60L 1/00* (2006.01)

(52) U.S. Cl.
USPC .......................................................... 307/9.1

(58) Field of Classification Search ................... 307/9.1, 307/147
See application file for complete search history.

(56) References Cited

U.S. PATENT DOCUMENTS

| | | |
|---|---|---|
| 2005/0061561 A1 | 3/2005 | Leonardi et al. |
| 2005/0068820 A1 | 3/2005 | Radosevich et al. |

FOREIGN PATENT DOCUMENTS

| | | |
|---|---|---|
| EP | 1 359 033 A1 | 11/2003 |
| WO | WO 95/34948 A1 | 12/1995 |
| WO | WO 2004/037613 A2 | 5/2004 |

*Primary Examiner* — Robert L. Deberadinis
(74) *Attorney, Agent, or Firm* — Berenato & White, LLC

(57) ABSTRACT

According to the disclosure, a power sub-assembly (3) for a micro-hybrid system (1) in an automobile includes an AC-DC converter (8) with a transistor bridge (13), an energy storage device (10) and a power bus (9) including at least two cylindrical conductors (22, 22'). According to the disclosure, conductors (22, 22') include respective coaxial cylindrical surfaces (23, 23'). The power bus integrated in the power subassembly allows for a parasitic inductance that is by far lower than that of the standard cables in power subassemblies of the prior art, particularly in order to avoid overvoltage at the terminals of the transistors in the AC-DC converter.

23 Claims, 3 Drawing Sheets

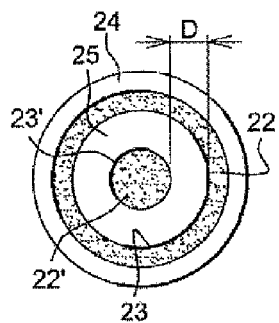 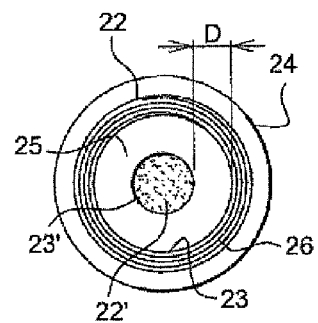 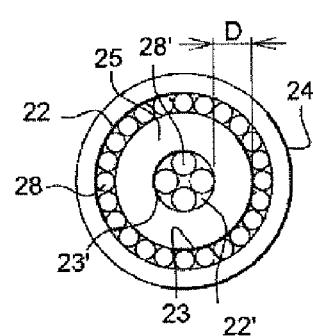
Fig. 3A          Fig. 3B          Fig. 3C
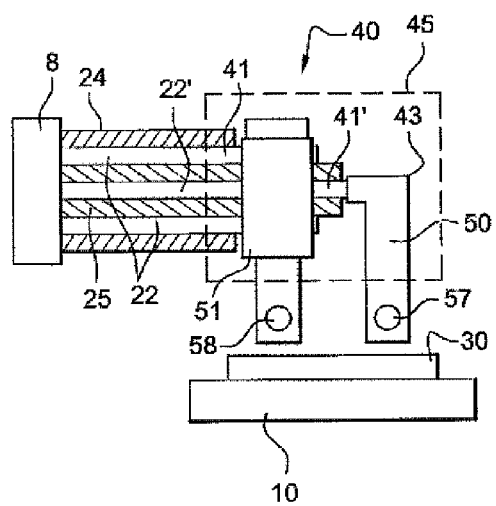
Fig. 4A
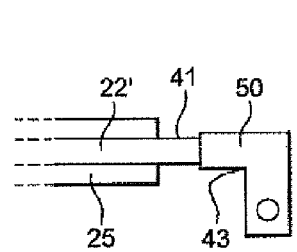 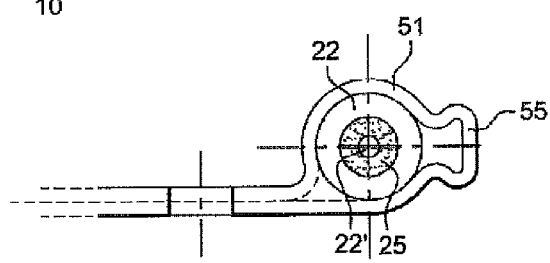
Fig. 4B          Fig. 4C

POWER SUBASSEMBLY FOR MICRO-HYBRID SYSTEM IN AN AUTOMOBILE

FIELD OF THE INVENTION

The present invention has applications in the motor vehicle field. More particularly, it relates to a power sub-assembly of a micro-hybrid system for a motor vehicle, comprising an AC-DC converter with a transistor bridge, an energy storage device, and a power bus.

BACKGROUND OF THE INVENTION

For some years, the demand for "clean" vehicles has tended to increase as a result of the needs firstly to reduce fuel consumption and secondly to limit pollution.

In general, hybrid systems and micro-hybrid systems are being developed for the purpose of fulfilling the aforementioned needs.

Micro-hybrid systems are known, for example, with recuperative braking, wherein an alternator is used to collect mechanical torque, thus giving rise to braking of the vehicle. The alternator converts this collected torque into electrical energy, in order to charge an energy storage device in the form for example of a pack of super-capacitors or a battery. This energy which is recuperated is then returned to the various items of electrical and electronic equipment which the motor vehicle includes. In so-called "14+X" micro-hybrid systems with floating direct voltage, this energy can also be used to start the thermal engine, or to assist the torque of this thermal engine.

However, the integration of this type of micro-hybrid system in the engine compartment of a modern motor vehicle may cause problems. In fact, a micro-hybrid system consists of elements which must be interconnected with one another, some of these elements being able to be relatively bulky. Since the engine compartment of a motor vehicle has a relatively limited amount of space, it is becoming increasingly difficult for car manufacturers to incorporate new systems into them. This results is a certain number of technical choices, such as the fact of moving the energy storage device away from the other elements of the micro-hybrid system, for example by installing this device in the boot. Thus, the lengths of branching cables which form the power bus can be substantial, and introduce parasitic inductances of a type which is to the detriment of the micro-hybrid system in switched dynamic running conditions.

The power bus which is placed between the AC-CD converter of the micro-hybrid system and the energy storage device poses a particular problem. In fact, substantial pulse currents can be conveyed via this power bus, between the AC-DC converter and the energy storage device. For example, substantial pulse currents intervene during the functioning in starter mode of the rotary electric machine. The parasitic inductance of this power bus can firstly affect the energy performance at certain frequencies, and can also give rise to excess resonance voltages. In addition, the parasitic inductance can affect adversely the electromagnetic compatibility.

The excess resonance voltages can give rise to uncontrolled avalanche phenomena in MOSFET power transistors of the AC-DC converter, these avalanche phenomena being able to detract from the functioning of these transistors, or damage them. The reliability of the micro-hybrid system can therefore be reduced greatly by these avalanche phenomena.

In the state of the art, it is known to use as a power bus a cable consisting of two juxtaposed insulated cylindrical conductors. This type of cable permits reduction of the parasitic inductance in comparison with other wiring solutions, such as wiring which involves a single conductor which forms a positive core, and requires a return via the bodywork of the motor vehicle which forms a negative core, this return acting as an earth. For example, for a cable length of 3 m, inductance of approximately 3 µH is obtained.

The aforementioned standard cable can be used in micro-hybrid systems for currents which can be as much as 600 A, particularly in the starter mode of the thermal engine, as a result of the presence in the AC-DC converter of a capacitor with a few tens of µF for example 60 µF, constituting a passive filter which limits the excess voltages.

For micro-hybrid systems with currents above 600 A, with this standard cable which has a parasitic inductance of approximately 3 µH for a length of 3 m, a capacitor with a far greater capacity is necessary. For example, in a known micro-hybrid system which functions with currents of approximately 1100 A, a capacitor of approximately 2000 µF may be necessary at the level of the AC-DC converter. Since this capacitor must preferably be integrated in the AC-DC converter, there is an integration constraint which is difficult to fulfil because of the size of the capacitor.

SUMMARY OF THE INVENTION

The object of the invention is to provide a power sub-assembly of a micro-hybrid system which does not have the disadvantages of the solutions according to the state of the art previously described.

The power sub-assembly according to the invention comprises an AC-DC converter, an energy storage device, and a power bus comprising at least two cylindrical conductors.

According to the invention, the conductors comprise respective coaxial cylindrical surfaces.

The power bus which is integrated in a power sub-assembly according to the invention enables a parasitic inductance which is distinctly lower than that of the standard cables of the power sub-assemblies according to the state of the art. In fact, for a length of 3 m, it is possible to reduce the parasitic inductance to a value which is between approximately 0.1 µH and approximately 1 µH.

This results in a reduction in the design stresses, in particular because the capacitor at the terminals of the AC-DC converter can retain a low value. In addition, this power bus enables a simple connection which is favourable for good reliability.

According to other characteristics of the invention:

The power bus comprises at least two coaxial conductors.
The power bus comprises at least one conductor with a cross-section of between approximately 15 mm$^2$ and approximately 50 mm$^2$. This characteristic according to the invention makes it possible to standardise the power sub-assembly for a large number of micro-hybrid systems. In fact, the variability of the section of at least one coaxial conductor permits adaptation to the length of this conductor, the latter varying according to the location in the vehicle of the storage device, and adaptation to the high currents which are conveyed by the power bus.
The power bus comprises a central conductor which has a circular section. This embodiment, which corresponds to the conventional structure of a coaxial conductor, makes it possible to obtain an optimum level in the reduction of the parasitic inductance of the conductors.

The power bus comprises at least one conductor formed by a plurality of rolled metal sheets. This characteristic makes it possible to facilitate handling of the conductor as a result of greater flexibility.

The power bus comprises at least one conductor formed by a metal braid. This characteristic permits firstly a lower cost, and secondly it facilitates handling of the conductor as a result of greater flexibility.

The power bus comprises at least one conductor which is made mainly of copper, thus assuring very good conductivity.

The power bus comprises at least one conductor which is made mainly of aluminium. The aluminium material makes it possible to reduce the cost of the conductor, and also to minimise its weight.

The power bus comprises at least one conductor which is accommodated in a sheath.

The sheath is formed by insulation which is placed between two conductors, and the insulation comprises a thickness of between approximately 0.1 mm and approximately 5 mm. Advantageously, this characteristic according to the invention makes it possible to obtain a compromise between minimal inductance and adequate thermal insulation between two conductors.

The power bus comprises a connection means, and the connection means comprises at least one terminal which is assembled on one end of a conductor.

The connection means comprises an assembled terminal which has the same longitudinal axis as the respective conductor.

The connection means comprises an assembled terminal of the bent type.

The connection means comprises an assembled terminal of the flange type.

The connection means comprises an assembled terminal of the half-moon type.

The connection means comprises a terminal which is assembled by means of crimping and/or welding.

The power bus comprises a connection means, and this connection means comprises at least one terminal which is integral with, and is formed at one end of, a conductor. This characteristic advantageously makes it possible to make a saving in terms of material, and to eliminate a contact resistor.

The connection means comprises a terminal which is integral with, and is formed by crushing and perforating or opening up one end of a conductor.

The power sub-assembly comprises at least one element which forms a cover which is designed for the protection of a connection means. The cover can advantageously assure retention of the ends of the conductors which form the connection means, such as to make the power sub-assembly reliable. In addition, the cover makes it possible to assure the sealing of the connection means.

The cover comprises a polarising slot which advantageously makes it possible to avoid connection errors between the connection means, and thus to further increase the reliability of the power sub-assembly.

The AC-DC converter is reversible.

The energy storage device comprises a super-capacitor.

According to other aspects, the invention also relates to a micro-hybrid system comprising a power sub-assembly such as previously described briefly, as well as a motor vehicle which is equipped with a micro-hybrid system of this type.

BRIEF DESCRIPTION OF THE DRAWINGS

Other characteristics and advantages of the invention will become apparent from reading the following detailed description, for understanding of which reference will be made to the figures it comprises, in which:

FIGS. 3A, 3B and 3C represent cross-sections according to the section of three different embodiments of a power bus included in a power sub-assembly according to the invention;

FIG. 4A represents a view in cross-section of an embodiment of a connection means which is situated at ends of the power bus included in a power sub-assembly according to the invention;

FIGS. 4B and 4C represent respectively simplified views in cross-section of the connection means in FIG. 4A;

DETAILED DESCRIPTION

Figure 1:
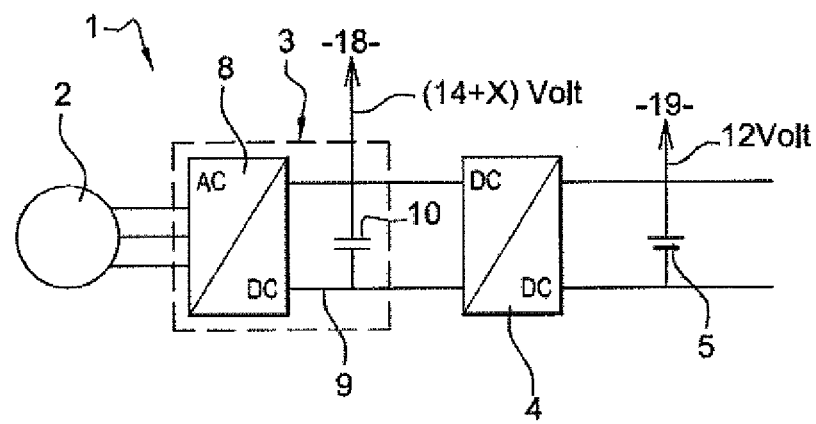
FIG. 1 represents in a simplified manner a micro-hybrid system comprising a power sub-assembly according to the invention.

FIG. 1 shows a plurality of modules of a micro-hybrid system 1 with an alternator-starter for a motor vehicle. These modules include:
 a reversible polyphase rotary electric machine 2;
  a power sub-assembly 3, which is connected to the machine 2, and comprises elements 8, 9 and 10 described hereinafter;
 a DC/DC voltage converter 4, which is connected to the power sub-assembly 3; and
 an energy storage unit 5 which is connected to the DC/DC converter 4.

In this embodiment, the micro-hybrid system comprises a rotary electric machine 2 of the alternator-starter type.

The power sub-assembly 3 comprises:
 a reversible AC/DC converter 8;
 a power bus 9; and
 an energy storage device 10, which is of the super-capacitor type in this embodiment.

The AC/DC converter 8 makes it possible in particular to convert a direct voltage which is obtained from energy storage means of the vehicle into polyphase alternating voltages which are used to drive the alternator starter 2.

The power bus 9 makes it possible to transfer energy between the AC/DC converter 8 and the storage device 10.

The storage device 10 can comprise a plurality of super-capacitors which form a pack and are disposed in the form of cells in series.

The DC/DC voltage converter 4 permits two-way transfers of electrical energy between the power sub-assembly 3 and the energy storage unit 5.

The energy storage unit 5 can comprise a conventional supply battery, for example of the lead battery type. The concept of a supply battery 5 is understood in the present invention as covering any device which forms a rechargeable electrical energy reservoir, at the terminals of which a non-zero electric voltage is available, at least in a state of non-zero charge of the device.

The energy storage unit 5 and the energy storage device 10, respectively the supply battery 5 and the super-capacitors 10 or pack of super-capacitors, constitute the energy storage means. These storage means can in particular make it possible to supply electrical or electronic consumer units of the vehicle. These consumer units in a motor vehicle are typically headlights, a radio, air conditioning, windscreen wipers, etc.

When the thermal engine is started, or during a phase of assistance with torque of the thermal engine, if the energy storage means 5 and 10 are charged, and more particularly the pack of super-capacitors 10, the alternator-starter 2 becomes available for functioning in electric motor mode.

When the rotary electric machine 2 is functioning in electric motor mode, the AC/DC converter 8 operates such as to convert direct voltage which is obtained from the energy storage means of the vehicle into polyphase alternating voltages, and more specifically three-phase voltages in the embodiment in FIG. 1. The polyphase alternating voltages supply stator coils in order to give rise to the rotation of an output shaft (not shown) of the rotary electric machine 2. The end of this functioning mode is decided by the micro-hybrid system 1 when the energy storage means 5 and 10 are empty, or when the starting or acceleration phase is ended.

When the rotary electric machine 2 is functioning in alternator mode, or more specifically in normal alternator mode or recuperative braking alternator mode, the AC/DC converter 8 operates such as to convert polyphase voltages supplied by the machine 2 into a direct voltage which is used to supply the electrical distribution network of the vehicle, and charge the energy storage means of the latter.

In vehicles which are equipped with so-called "14+X" dual voltage electrical distribution networks, a high floating direct voltage can be supplied directly from the voltage which is present at the terminals of the pack of super-capacitors 10. The energy which is supplied to this 14+X network can then be obtained from the pack of super-capacitors 10, from the machine 2 operating in alternating mode by means of the AC/DC converter 8, or from the supply battery 5 by means of the DC/DC converter 4 which is thus operating as a step-up transformer.

As shown in FIG. 1, connections 18 and 19 of the micro-hybrid system are provided respectively for a 14+X network functioning with floating direct voltage and the 12 V network which is habitually present in current motor vehicles.

The power sub-assembly 3 can be integrated in different locations in the motor vehicle, even somewhere other than under the vehicle engine bonnet. Thus, the elements 8, 9 and 10 of the power sub-assembly 3 can each be integrated in different locations in a motor vehicle. In a particular example, the AC/DC converter 8 is placed under the bonnet of the vehicle, whereas the storage device 10 is placed in the boot of the vehicle, and thus the power bus 9 extends substantially along the entire length of the vehicle, such as to connect the two elements 8 and 10.

Figure 2:
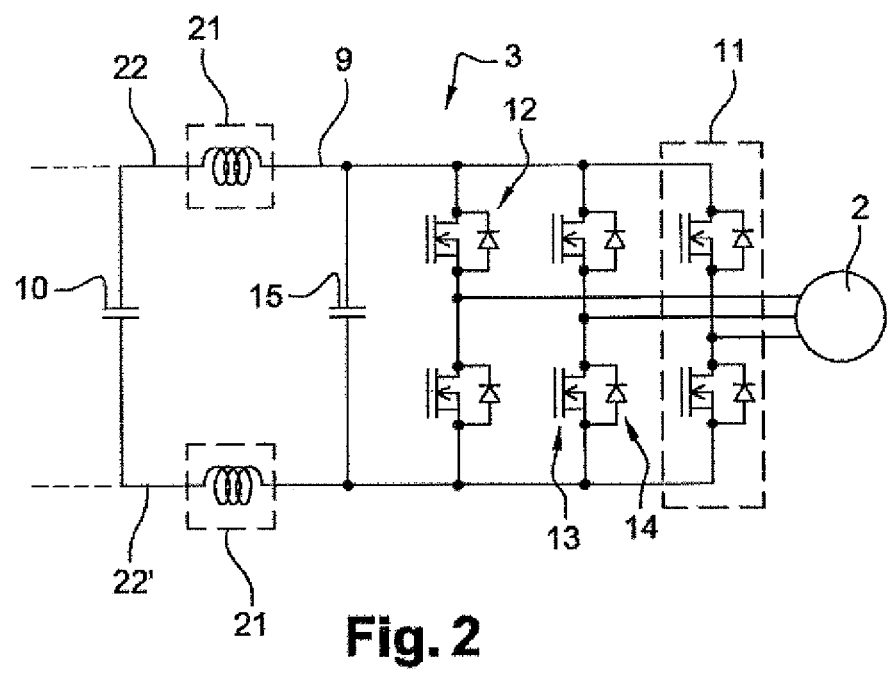
FIG. 2 represents in a detailed manner the power sub-assembly in FIG. 1.

FIG. 2 shows the power sub-assembly 3 according to the invention, comprising the AC/DC converter 8 which is connected firstly to the alternator-starter 2, and secondly to the pack of super-capacitors 10.

The AC/DC converter 8 is a three-phase electrical device which makes it possible, particularly in the electric motor mode of the alternator-starter, to convert a direct voltage into polyphase alternating voltages. The AC/DC converter 8 comprises a plurality of bridge arms 11, in this case a total of 3, equal to the number of electric phases. Each bridge arm 11 comprises 2 switches 12 which are controlled electronically, each formed by a power transistor 13 and a free wheel diode 14. The transistor 13 can for example be a transistor of the MOSFET type. As is well known to persons skilled in the art, the MOSFET transistor 13 comprises two functioning states, i.e. a passage state which permits passage of a current, and a blocked state which prevents the passage of a current. The passage from one state to another is carried out by switching. The transistor 13 has a third state which is known as "avalanche passage". For example, this third state may arise when excess voltage occurs at the terminals of a transistor 13 during switching from a passage state to a blocked state. When the voltage at the terminals of the transistor 13 exceeds a value of 45V for example, the avalanche phenomenon occurs, thus giving rise to a very rapid increase in the temperature of the transistor. This temperature, which is known as the junction temperature of the transistor 13, can reach a value close to 200° C., which is much higher than the maximum junction temperature of 175° C. In this case, the switching function of the transistor 13 becomes inoperative, and the functioning of the bridge is disrupted or blocked.

The AC/DC converter 8 also comprises an element 15 for filtering the output voltage of the converter 8 in order to satisfy the requirements of electromagnetic compatibility. This filtering element comprises a capacitor 15 with a low value, for example 60 µF, such as to form a passive filter.

The power bus 9 comprises at least two conductors 22, 22' comprising a parasitic line inductance 21 which must be as low as possible in order to optimise the energy transfers via the power bus 9.

When the alternator-starter 2 is functioning as an electric motor, for example for starting the thermal engine, the currents which circulate via the power bus 9 and the AC/DC converter 8 are very high, and can reach 1100 A.

FIG. 3 shows a cross-section according to the section of a first embodiment of the power bus 9. This power bus 9 comprises conductors 22, 22' which are accommodated in a sheath 24 formed by insulation 25. The conductors 22, 22' comprise respective coaxial cylindrical surfaces 23, 23'.

As shown in FIG. 3A, the two so-called coaxial conductors 22, 22' form a conventional coaxial cable which has a central conductor 22' with a circular cross-section. According to particular embodiments of the invention, and in accordance with its applications, a coaxial conductor 22 comprises a cross-section which varies between approximately 15 mm$^2$ and approximately 50 mm$^2$. The circular form of the conductors 22, 22' permits improvement of the electromagnetic coupling, and enables an inductance value of between approximately 0.1 µH and approximately 1 µH.

In addition, the two coaxial conductors 22, 22' in FIG. 3A are accommodated in a single sheath 24. This characteristic makes it possible to minimise the thickness of the insulation 25 which forms the sheath 24, such as to decrease a distance D between the two coaxial conductors 22, 22'. The insulation is placed between the two conductors which correspond respectively to positive and negative cores, in order to isolate them from one another. Minimising the distance D between the two coaxial conductors 22, 22' makes it possible to decrease the line inductance 21 further still. According to particular embodiments of the invention, and in accordance with its applications, the thickness of the insulation can for example be between approximately 0.1 mm and approximately 5 mm. These applications make it possible to reduce the inductance value further to a value which is between approximately 0.1 µH and approximately 0.5 µH, and induce cut-off frequencies of the pass-band which are equal to approximately 5 MHz and approximately 65 MHz.

FIG. 3B shows a cross-section according to the section of a second embodiment of the power bus 9 according to the invention, again with coaxial conductors 22, 22'. In this embodiment, the coaxial cable 22 comprises a plurality of rolled metal sheets 26. In comparison with the embodiment which is illustrated in FIG. 3A, the characteristic of FIG. 3B permits an increase in the flexibility of the conductor 22. It will be appreciated that the conductor 22' can also comprise a plurality of rolled metal sheets.

FIG. 3C shows a cross-section according to the section of a third embodiment of the power bus 9. In this embodiment, the conductors 22, 22' comprise metal braids which are formed by a plurality of wires with a small cross-section 28, 28'. The metal braids comprise substantially cylindrical coaxial surfaces 23, 23' which have the same function as the cylindrical coaxial surface previously described with reference to FIG. 3A. This embodiment has the advantage of using low-cost conductors.

The power bus 9 according to the invention guarantees the reliability of the micro-hybrid system 1. In fact, the characteristics of the conductors 22, 22' according to the invention make it possible to limit the inductance 21, such as to avoid the excess voltages at the terminals of the transistors 13 of the AC/DC converter 8, and the resulting avalanche phenomena. A power bus 9 according to the invention permits efficient transfer of energy between the storage means 5 and 10 and the alternator-starter 2, despite a substantial length of the conductors 22, 22' and high current values.

In general, the coaxial conductors 22, 22' of the power bus 9 shown in FIGS. 4A, 4B and 4C will preferably be made of a material which comprises mainly copper, so as to benefit from very low resistivity. However, the coaxial conductors 22, 22' can also be made of a material which comprises mainly aluminium. Aluminium makes it possible to benefit from a lower cost in comparison with copper, whilst retaining low resistivity. In addition, aluminium has the advantage of lower weight than copper.

FIGS. 4A, 4B and 4C illustrate an example of a connection means 40 which is situated at ends 41, 41' of the conductors 22, 22' of the power bus 9 according to the invention. The power bus 9 comprises the connection means 40 which include terminals 50, 51 assembled on the ends 41, 41' of the conductors 22, 22' respectively. In this case the power bus comprises two terminals 50, 51 of an assembled type.

In this example of the connection means 40 illustrated in FIGS. 4A, 4B and 4C, the assembled terminals 50, 51 are secured to a complementary connection means 30 or terminal block of the pack of super-capacitors 10 by means of a securing element (not shown), which is formed for example by two bolts and two nuts. The bolts of the securing element are inserted in recesses 57, 58 in the terminals 50 and 51 respectively, such as to pass through the connection means 40 and the terminal block 30. Also, mechanical and electrical assembly between the elements 30 and 40 is obtained by tightening the nuts. It will be appreciated that securing elements other than nuts and bolts can be adopted by persons skilled in the art, according to the applications of the invention. For example, the securing element can be created by means of screws or pins.

As shown in FIG. 4B, the terminal 50 is assembled by being welded onto one end of the conductor 22'. In this embodiment, the terminal 50 is of the type which is bent in a direction which is substantially perpendicular to the longitudinal axis of the conductor 22'. It will be appreciated that the assembled terminal 50 of the bent type can be bent in a direction which is adapted, and can have forms and dimensions different from those in FIG. 4B, in particular according to the configuration of the terminal block 30. For example, the terminal of the bent type 50 can be formed with angles other than 90°.

As shown in FIG. 4C, the terminal 51 is assembled by being crimped onto one end of the conductor 22. In this embodiment, the terminal 51 is of the flange type. This terminal of the flange type 51 surrounds the end 41 of the conductor 22 without the sheath 24. The terminal of the flange type 51 is crimped onto the end 41 of the conductor by means of a retention element 55.

The connection of an end of the power bus to the pack of super-capacitors has previously been described with reference to FIGS. 4A, 4B and 4C. In this embodiment, a similar connection is provided between the other end of the power bus and the AC/DC converter. However, in other embodiments of the invention, the connections to the ends of the power bus can be different, and can for example comprise connections of the types described hereinafter, with reference to FIGS. 4D, 4E and 4F.

Figure 4D:
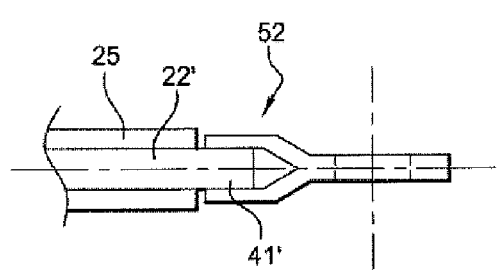
FIG. 4D represents a simplified view in cross-section of another embodiment of a connection means which is situated at one end of the power bus according to the invention.

FIG. 4D illustrates another example of the connection means situated at one end 41' of the power bus 9. In this example, the connection means 40 comprises an assembled terminal 52 which is formed without curvature, such as to have the same longitudinal axis as the end 41' of the respective conductor 22'.

Figure 4E:
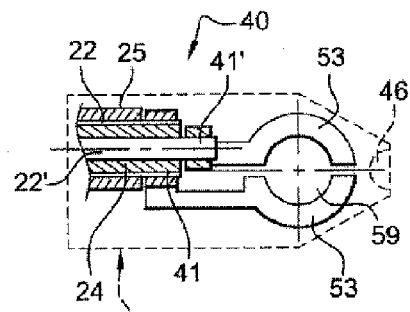
FIGS. 4E and 4F represent views in cross-section of two other embodiments of a connection means situated at the ends of the power bus according to the invention.
Figure 4F:
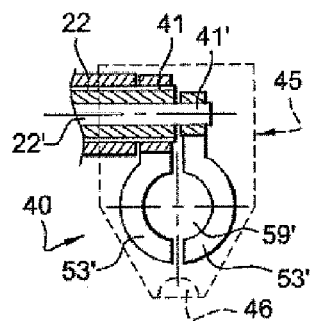

FIGS. 4E and 4F illustrate other examples of the connection means 40 situated at ends 41, 41' of the power bus 9.

In these examples of the connection means 40, terminals 53, 53' in the form of a half-moon are assembled by being crimped then welded onto the ends 41, 41' of the coaxial conductors 22, 22'.

As shown in FIG. 4E, the terminals 53 of the half-moon type are assembled such as to obtain a connection means 40 which is situated on a longitudinal axis which is substantially parallel to the longitudinal axis of the coaxial conductors 22, 22'.

As shown in FIG. 4F, the terminals 53' of the half-moon type are assembled such as to obtain a connection means 40 which is situated on an axis perpendicular to the longitudinal axis of the coaxial conductors 22, 22'. As also shown in FIG. 4F, the two terminals 53' are oriented according to the same axis, which is perpendicular to the longitudinal axis of the coaxial conductors 22, 22'.

It should be noted that each of the terminals previously described with reference to FIGS. 4A to 4F can be assembled by crimping and/or welding.

The characteristics previously described of the embodiments in FIGS. 4E and 4F advantageously make it possible to crimp the assembled terminals of the half-moon type 53, 53' onto a terminal block (not shown) in a single operation, i.e. by means of an operation of crimping of a securing element which is inserted in recesses 59, 59' defined respectively between two terminals 53 and between two terminals 53'. The assembly method between the terminal block and the connection means 30 is thus simplified. In addition, these characteristics also make it possible to improve the compactness of the power sub-assembly 3.

Figure 5:
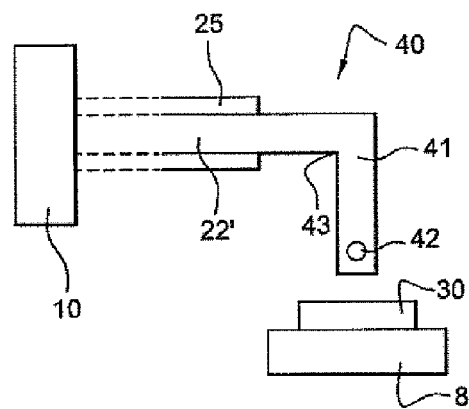
FIG. 5 represents a top view of another embodiment of a connection means situated at one end of the power bus according to the invention.

With reference to FIG. 5, another example of a connection means 40 is now described briefly. As shown in FIG. 5, the connection means 40 comprises a terminal 42 which is integral with, and is formed on one end 41' of a conductor 22'. The terminal 42, known as the terminal obtained, is in this case formed by crushing and opening up the end 41' of the conductor 22'. As a variant, it will be appreciated that the terminal 42 can be obtained by means of another machining method known by persons skilled in the art, for example by perforation.

It will be noted that this embodiment in FIG. 5 with the terminal obtained 42 makes it possible in an advantageous manner to obtain a saving in material, and therefore to reduce the cost. In addition, the terminal obtained 42 makes it possible to eliminate a contact resistor in comparison with an assembled terminal. The terminal 42 which is illustrated in FIG. 5 can be secured to a terminal block 30 which is contained in the AC/DC converter 8. It will be appreciated that the terminal block can be contained in a pack of super-capacitors.

According to the invention, as shown in FIGS. 4A, 4E and 4F, a cover 45 can be provided for the protection of a connection means 30 or 40. In certain embodiments of the power sub-assembly according to the invention, the cover 45 can make it possible in particular to improve the reliability of the sub-assembly, for example in terms of electrical protection against short circuits, or in terms of protection against the environment. Advantageously, this cover 45 makes it possible to assure reinforced sealing against water or dust.

In addition, the plastic cover 45 can comprise a polarising slot 46, which is illustrated in FIGS. 4E and 4F, in order to prevent connection errors between the elements 30 and 40 during assembly operations.

It will be appreciated that the invention is not limited to the embodiments which have previously been described, and many variants can be produced by persons skilled in the art. In particular, the invention has particularly advantageous applications in combination with the so-called 14+X dual voltage network system. In addition, the invention can also be used both in combination with a system comprising a rotary electric machine which functions as an alternator, and with a system comprising a rotary electric machine which functions as an alternator-starter.

The invention claimed is:

1. A power sub-assembly of a micro-hybrid system for a vehicle, comprising:
   a reversible AC-DC converter (8) with a transistor bridge (13);
   an energy storage device (10);
   a power bus (9) comprising at least two cylindrical conductors (22, 22'), characterised in that the conductors (22, 22') comprise respective coaxial cylindrical surfaces (23, 23').

2. A power sub-assembly according to claim 1, characterised in that the power bus (9) comprises at least two coaxial conductors (22, 22').

3. A power sub-assembly according to claim 1, characterised in that the power bus (9) comprises at least one conductor (22, 22') with a cross-section of between approximately 15 mm² and approximately 50 mm².

4. A power sub-assembly according to claim 1, characterised in that the power bus (9) comprises a central conductor (22') which has a circular cross-section.

5. A power sub-assembly according to claim 1, characterised in that the power bus (9) comprises at least one conductor (22, 22') formed by a plurality of rolled metal sheets (26).

6. A power sub-assembly according to any claim 1, characterised in that the power bus (9) comprises at least one conductor (22, 22') formed by a metal braid.

7. A power sub-assembly according to claim 1, characterised in that the power bus (9) comprises at least one conductor (22, 22') which is made mainly of copper.

8. A power sub-assembly according to claim 1, characterised in that the power bus (9) comprises at least one conductor (22, 22') which is made mainly of aluminium.

9. A power sub-assembly according to any claim 1, characterised in that the power bus (9) comprises at least one conductor (22, 22') which is accommodated in a sheath (24).

10. A power sub-assembly according to any claim 1, characterised in that the power bus (9) comprises at least one insulator (25) which is placed between two conductors (22, 22'), and in that the insulator (25) comprises a thickness of between approximately 0.1 mm and approximately 5 mm.

11. A power sub-assembly according to claim 1, characterised in that the power bus (9) comprises a connection means (40), the said connection means (40) comprising at least one terminal (50, 51, 52, 53, 53') which is assembled on one end (41, 41') of a conductor (22, 22').

12. A power sub-assembly according to claim 11, characterised in that the connection means (40) comprises an assembled terminal (52, 53) which has the same longitudinal axis as the respective conductor (22, 22').

13. A power sub-assembly according to claim 11, characterised in that the connection means (40) comprises an assembled terminal (50, 53') of the bent type.

14. A power sub-assembly according to claim 11, characterised in that the connection means (40) comprises an assembled terminal (51) of the flange type.

15. A power sub-assembly according to claim 11, characterised in that the connection means (40) comprises an assembled terminal (53, 53') of the half-moon type.

16. A power sub-assembly according to claim 11, characterised in that the terminal (50, 51, 52, 53, 53') of the connection means (40) is assembled by means of crimping and/or welding.

17. A power sub-assembly according to claim 11, characterised in that it comprises an element which forms at least one cover (45) which is designed for the protection of the connection means (40).

18. A power sub-assembly according to claim 17, characterised in that the cover (45) comprises a polarising slot (46).

19. A power sub-assembly according to claim 1, characterised in that the power bus (9) comprises a connection means (40), the said connection means (40) comprising at least one terminal (42) which is integral with, and is formed at one end (41, 41') of a conductor (22, 22').

20. A power sub-assembly according to claim 19, characterised in that the terminal (42) of the connection means (40) is formed by crushing and perforating or opening up one end (41, 41') of a conductor (22, 22').

21. A power sub-assembly according to claim 1, characterised in that the energy storage device (10) comprises at least one super-capacitor.

22. A micro-hybrid system for a vehicle, comprising a power sub-assembly (3) according to claim 1.

23. A vehicle comprising a micro-hybrid system (1) according to claim 22.

* * * * *